United States Patent
Hirakawa et al.

(10) Patent No.: US 8,481,220 B2
(45) Date of Patent: Jul. 9, 2013

(54) FUEL CELL POWER SUPPLY (75) Inventors: Mitsuaki Hirakawa, Wako (JP); Minoru Noguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 531 days.

(21) Appl. No.: 12/320,188

(22) Filed: Jan. 21, 2009

(65) Prior Publication Data

US 2009/0186247 A1    Jul. 23, 2009

(30) Foreign Application Priority Data

Jan. 23, 2008 (JP) .................... 2008-012178

(51) Int. Cl.
*H01M 8/04* (2006.01)
(52) U.S. Cl.
USPC ............... 429/430; 429/431; 429/432
(58) Field of Classification Search
USPC .................... 429/400–535
See application file for complete search history.

(56) References Cited

U.S. PATENT DOCUMENTS

| 2003/0118876 A1* | 6/2003 | Sugiura et al. ............ 429/9 |
| 2004/0106022 A1* | 6/2004 | Saito et al. ............ 429/22 |
| 2007/0141428 A1* | 6/2007 | Skidmore et al. ............ 429/34 |
| 2007/0275276 A1* | 11/2007 | Saeki et al. ............ 429/13 |

FOREIGN PATENT DOCUMENTS

| JP | 2006-254610 | 9/2006 |
| JP | 2006-331849 | 12/2006 |
| JP | 2006-351421 | 12/2006 |
| JP | 2007-207620 | 8/2007 |
| JP | 2007-209161 | 8/2007 |

* cited by examiner

*Primary Examiner* — Basia Ridley
*Assistant Examiner* — James Lee
(74) *Attorney, Agent, or Firm* — Squire Sanders (US) LLP (57) ABSTRACT

A fuel cell power supply includes a fuel cell voltage detection means which detects a terminal-to-terminal voltage of the fuel cell; an internal resistance calculation element configured to supply electric power from a battery to a motor via a second DC-DC converter and configured to calculates a resistance value of an internal resistance of the fuel cell on the basis of a detection voltage of the fuel cell in a state where a current output of the fuel cell is stopped, a detection voltage of a terminal-to-terminal voltage of the fuel cell in a state where the output current of the fuel cell is adjusted to a value, and the value; and a deterioration level determination element configured to determines a deterioration level of the fuel cell on the basis of a change in the resistance value of the internal resistance of the fuel cell.

10 Claims, 4 Drawing Sheets

FUEL CELL POWER SUPPLY

BACKGROUND OF THE INVENTION

1. Field of the Invention

The present invention relates to a fuel cell power supply which has a fuel cell and a power storage means and supplies electric power from the fuel cell and the power storage means to electric loads via a DC-DC converter.

2. Description of the Related Art

Conventionally, as a fuel cell power supply having a deterioration determining function of a fuel cell, there has been suggested, for example, a fuel cell power supply having a configuration in which a fuel cell and a secondary battery are connected in parallel with each other to determine a deterioration level of the fuel cell on the basis of a change in output power relative to the output current of the fuel cell (for example, refer to Japanese Patent Application Laid-Open No. 2006-331849).

In the fuel cell power supply disclosed in Japanese Patent Application Laid-Open No. 2006-331849, a storage unit previously stores data of a relation (I-P characteristics) between the output current and output power of the fuel cell in the initial state of the fuel cell and in the deteriorated state thereof. The deterioration level of the fuel cell is then determined by applying detected values of the output current and output power of the fuel cell to the data of the I-P characteristics.

In this manner, the fuel cell power supply disclosed in Japanese Patent Application Laid-Open No. 2006-331849 determines the deterioration level of the fuel cell on the basis of the preset I-P characteristics of the fuel cell in the initial state of the fuel cell and in the deteriorated state of the fuel cell. Therefore, the fuel cell power supply has a problem of being incapable of accurately detecting the deterioration level of the fuel cell due to an effect of individual variability of the I-P characteristics of the fuel cell.

The present invention has been provided in view of the above background. Therefore, it is an object of the present invention to provide a fuel cell power supply capable of accurately determining a deterioration level of a fuel cell or a power storage means.

SUMMARY OF THE INVENTION

The present invention has been provided to achieve the above object. Therefore, first to third aspects of the present invention relate to a fuel cell power supply, which comprises: a fuel cell; a first DC-DC converter having first and second I/O sections, with the first I/O section connected to an electric load and the second I/O section connected to the fuel cell; a power storage means; and a bidirectional second DC-DC converter having first and second I/O sections, with the first I/O section connected to the electric load and the second I/O section connected to the power storage means.

Moreover, according to the first aspect of the present invention, the fuel cell power supply further comprises: a fuel cell voltage detection means which detects a terminal-to-terminal voltage of the fuel cell; an internal resistance calculation means which supplies electric power from the power storage means to the electric load via the second DC-DC converter and calculates an internal resistance value of the fuel cell on the basis of a detection voltage of the fuel cell voltage detection means in a state where a current output of the fuel cell is stopped by controlling an operation of the first DC-DC converter, a detection voltage of the fuel cell voltage detection means in a state where the output current of the fuel cell is adjusted to a first predetermined current value by controlling the operation of the first DC-DC converter, and the first predetermined current value; and a deterioration level determination means which determines a deterioration level of the fuel cell on the basis of a change in the internal resistance value of the fuel cell calculated by the internal resistance calculation means.

According to this invention, the internal resistance calculation means supplies electric power from the power storage means to the electric load via the second DC-DC converter and stops the current output of the fuel cell by controlling the operation of the first DC-DC converter. This enables the fuel cell voltage detection means to detect an open-circuit voltage of the fuel cell while operating the electric load by securing power supply from the power storage means to the electric load.

Moreover, if the internal resistance calculation means adjusts the output current of the fuel cell to the first predetermined current value by controlling the operation of the first DC-DC converter, a voltage drop in the internal resistance of the fuel cell based on the first predetermined current value is equal to a difference between the terminal-to-terminal voltage of the fuel cell and the open-circuit voltage at that time. Therefore, the internal resistance calculation means is capable of calculating the internal resistance value of the fuel cell on the basis of the detection voltage of the fuel cell voltage detection means (the open-circuit voltage of the fuel cell) in the state where the current output of the fuel cell is stopped by controlling the operation of the first DC-DC converter, the detection voltage of the fuel cell voltage detection means in the state where the output current of the fuel cell is adjusted to the first predetermined current value by controlling the operation of the first DC-DC converter, and the first predetermined current value.

In addition, the internal resistance value of the fuel cell increases along with the progress of deterioration of the fuel cell, and therefore the deterioration level determination means is capable of accurately determining the deterioration level of the fuel cell on the basis of a change in the internal resistance value of the fuel cell detected by the internal resistance calculation means, by suppressing the effect of individual variability of the fuel cell.

Moreover, according to the second aspect of the present invention, the fuel cell power supply further comprises: a switching means which switches a connection between the fuel cell and the first DC-DC converter between a conducting state and a non-conducting state; a fuel cell voltage detection means which detects a terminal-to-terminal voltage of the fuel cell; an internal resistance calculation means which supplies electric power from the power storage means to the electric load via the second DC-DC converter and calculates an internal resistance value of the fuel cell on the basis of a detection voltage of the fuel cell voltage detection means in a state where the switching means disconnects power between the fuel cell and the first DC-DC converter, a detection voltage of the fuel cell voltage detection means in a state where an output current of the fuel cell is adjusted to a first predetermined current value by controlling an operation of the first DC-DC converter, and the first predetermined current value; and a deterioration level determination means which determines a deterioration level of the fuel cell on the basis of a change in the internal resistance value of the fuel cell calculated by the internal resistance calculation means.

According to this invention, the internal resistance calculation means supplies electric power from the power storage means to the electric load via the second DC-DC converter, and the switching means stops the current output of the fuel cell by disconnecting power between the fuel cell and the first DC-DC converter. This enables the fuel cell voltage detection means to detect an open-circuit voltage of the fuel cell while operating the electric load by securing power supply from the power storage means to the electric load.

Moreover, if the internal resistance calculation means adjusts the output current of the fuel cell to the first predetermined current value by controlling the operation of the first DC-DC converter, a voltage drop in the internal resistance of the fuel cell based on the first predetermined current value is equal to a difference between the terminal-to-terminal voltage of the fuel cell and the open-circuit voltage at that time. Therefore, the internal resistance calculation means is capable of calculating the internal resistance value of the fuel cell on the basis of the detection voltage of the fuel cell voltage detection means (the open-circuit voltage of the fuel cell) in the state where the switching means disconnects power between the fuel cell and the first DC-DC converter and thereby the current output of the fuel cell is stopped, the detection voltage of the fuel cell voltage detection means in the state where the output current of the fuel cell is adjusted to the first predetermined current value by controlling the operation of the first DC-DC converter, and the first predetermined current value.

In addition, the internal resistance value of the fuel cell increases along with the progress of deterioration of the fuel cell, and therefore the deterioration level determination means is capable of accurately determining the deterioration level of the fuel cell on the basis of a change in the internal resistance value of the fuel cell calculated by the internal resistance calculation means, by suppressing the effect of individual variability of the fuel cell.

Moreover, according to the first and second aspects of the present invention, the fuel cell power supply further comprises a power storage means voltage detection means which detects a terminal-to-terminal voltage of the power storage means, and the internal resistance calculation means supplies electric power from the fuel cell to the electric load via the first DC-DC converter and calculates an internal resistance value of the power storage means on the basis of a detection voltage of the power storage means voltage detection means in a state where a current output from the power storage means is stopped by controlling an operation of the second DC-DC converter, a detection voltage of the power storage means voltage detection means in a state where the output current of the power storage means is adjusted to a second predetermined current value by controlling the operation of the second DC-DC converter, and the second predetermined current value, and the deterioration level determination means determines a deterioration level of the power storage means on the basis of a change in the internal resistance value of the power storage means calculated by the internal resistance calculation means.

According to this invention, the internal resistance calculation means supplies electric power from the fuel cell to the electric load via the first DC-DC converter and stops the input and output of the current of the power storage means by controlling the operation of the second DC-DC converter. This enables the power storage means voltage detection means to detect an open-circuit voltage of the power storage means while operating the electric load by securing power supply from the fuel cell to the electric load.

Moreover, if the internal resistance calculation means adjusts the input-output current of the power storage means to the second predetermined current value by controlling the operation of the second DC-DC converter, a voltage drop in the internal resistance of the power storage means based on the second predetermined current value is equal to a difference between the terminal-to-terminal voltage of the power storage means and the open-circuit voltage at that time. Therefore, the internal resistance calculation means is capable of calculating the internal resistance value of the power storage means on the basis of the detection voltage of the power storage means voltage detection means (the open-circuit voltage of the power storage means) in the state where the input and output of the current of the power storage means is stopped by controlling the operation of the second DC-DC converter, the detection voltage of the power storage means voltage detection means in the state where the input-output current of the power storage means is adjusted to the second predetermined current value by controlling the operation of the second DC-DC converter, and the second predetermined current value.

In addition, the internal resistance value of the power storage means increases along with the progress of deterioration of the power storage means, and therefore the deterioration level determination means is capable of accurately determining the deterioration level of the power storage means on the basis of a change in the internal resistance value of the power storage means calculated by the internal resistance calculation means, by suppressing the effect of individual variability of the power storage means.

Subsequently, according to the third aspect of the present invention, the fuel cell power supply further comprises: a power storage means voltage detection means which detects a terminal-to-terminal voltage of the power storage means; an internal resistance calculation means which supplies electric power from the fuel cell to the electric load via the first DC-DC converter and calculates an internal resistance value of the power storage means on the basis of a detection voltage of the power storage means voltage detection means in a state where an input and an output of a current of the power storage means is stopped by controlling an operation of the second DC-DC converter, a detection voltage of the power storage means voltage detection means in a state where the input-output current of the power storage means is adjusted to a second predetermined current value by controlling the operation of the second DC-DC converter, and the second predetermined current value; and a deterioration level determination means which determines a deterioration level of the power storage means on the basis of a change in the internal resistance value of the power storage means calculated by the internal resistance calculation means.

According to this invention, the internal resistance calculation means supplies electric power from the fuel cell to the electric load via the first DC-DC converter and stops the input and output of the current of the power storage means by controlling the operation of the second DC-DC converter. This enables the power storage means voltage detection means to detect an open-circuit voltage of the power storage means while operating the electric load by securing power supply from the fuel cell to the electric load.

Moreover, if the internal resistance calculation means adjusts the input-output current of the power storage means to the second predetermined current value by controlling the operation of the second DC-DC converter, a voltage drop in the internal resistance of the power storage means based on the second predetermined current value is equal to a difference between the terminal-to-terminal voltage of the power storage means and the open-circuit voltage at that time. Therefore, the internal resistance calculation means is capable of calculating the internal resistance value of the power storage means on the basis of the detection voltage of the power storage means voltage detection means (the open-circuit voltage of the power storage means) in the state where the input-output current of the power storage means is stopped by controlling the operation of the second DC-DC converter, the detection voltage of the power storage means voltage detection means in the state where the input-output current of the power storage means is adjusted to the second predetermined current value by controlling the operation of the second DC-DC converter, and the second predetermined current value.

In addition, the internal resistance value of the power storage means increases along with the progress of deterioration of the power storage means, and therefore the deterioration level determination means is capable of accurately determining the deterioration level of the power storage means on the basis of a change in the internal resistance value of the power storage means calculated by the internal resistance calculation means, by suppressing the effect of individual variability of the power storage means.

Subsequently, a fourth aspect of the present invention relates to a fuel cell power supply, which comprises: a fuel cell; a first DC-DC converter having first and second I/O sections, with the first I/O section connected to a motor via an inverter and the second I/O section connected to the fuel cell; a power storage means; and a bidirectional second DC-DC converter having first and second I/O sections, with the first I/O section connected to the motor via the inverter and the second I/O section connected to the power storage means.

Moreover, the fuel cell power supply further comprises: a fuel cell voltage detection means which detects a terminal-to-terminal voltage of the fuel cell; an internal resistance calculation means which collects regenerative electric power of the motor into the power storage means via the inverter and the second DC-DC converter by regeneration of the motor and calculates an internal resistance value of the fuel cell on the basis of a detection voltage of the fuel cell voltage detection means in a state where a current output of the fuel cell is stopped by controlling an operation of the first DC-DC converter, a detection voltage of the fuel cell voltage detection means in a state where the output current of the fuel cell is adjusted to a first predetermined current value by controlling the operation of the first DC-DC converter, and the first predetermined current value; and a deterioration level determination means which determines a deterioration level of the fuel cell on the basis of a change in the internal resistance value of the fuel cell calculated by the internal resistance calculation means.

According to this invention, the internal resistance calculation means collects regenerative electric power of the motor into the power storage means via the inverter and the second DC-DC converter and stops the current output from the fuel cell by controlling the operation of the first DC-DC converter. This enables the fuel cell voltage detection means to detect an open-circuit voltage of the fuel cell while collecting the regenerative electric power of the motor into the power storage means.

Moreover, if the internal resistance calculation means adjusts the output current of the fuel cell to the first predetermined current value by controlling the operation of the first DC-DC converter, a voltage drop in the internal resistance of the fuel cell based on the first predetermined current value is equal to a difference between the terminal-to-terminal voltage of the fuel cell and the open-circuit voltage at that time. Therefore, the internal resistance calculation means is capable of calculating the internal resistance value of the fuel cell on the basis of the detection voltage of the fuel cell voltage detection means (the open-circuit voltage of the fuel cell) in the state where the current output of the fuel cell is stopped by controlling the operation of the first DC-DC converter, the detection voltage of the fuel cell voltage detection means in the state where the output current of the fuel cell is adjusted to the first predetermined current value by controlling the operation of the first DC-DC converter, and the first predetermined current value.

In addition, the internal resistance value of the fuel cell increases along with the progress of deterioration of the fuel cell, and therefore the deterioration level determination means is capable of accurately determining the deterioration level of the fuel cell on the basis of a change in the internal resistance value of the fuel cell detected by the internal resistance calculation means, by suppressing the effect of individual variability of the fuel cell.

Further, according to the first to fourth aspects of the present invention, the fuel cell power supply further comprises: a capacitor connected in parallel with the fuel cell; and a capacitor voltage detection means which detects a terminal-to-terminal voltage of the capacitor, and the internal resistance calculation means calculates an internal resistance value of the capacitor on the basis of a detection voltage of the capacitor voltage detection means in a state where an input and an output of a current of the capacitor is stopped by controlling the operation of the first DC-DC converter, a detection voltage of the capacitor voltage detection means in a state where the input-output current of the capacitor is adjusted to a third predetermined current value by controlling the operation of the first DC-DC converter, and the third predetermined current value, and the deterioration level determination means determines a deterioration level of the capacitor on the basis of a change in the internal resistance value of the capacitor calculated by the internal resistance calculation means.

According to this invention, the internal resistance calculation means stops the input and output of the current of the capacitor by controlling the operation of the first DC-DC converter, thereby enabling the capacitor voltage detection means to detect the open-circuit voltage of the capacitor. Moreover, if the internal resistance calculation means adjusts the input-output current of the capacitor to the third predetermined current value by controlling the operation of the first DC-DC converter, a voltage drop in the internal resistance of the capacitor based on the third predetermined current value is equal to a difference between the terminal-to-terminal voltage of the capacitor and the open-circuit voltage at that time.

Therefore, the internal resistance calculation means is capable of calculating the internal resistance value of the capacitor on the basis of the detection voltage of the capacitor voltage detection means (the open-circuit voltage of the capacitor) in the state where the input and output of the current of the capacitor is stopped by controlling the operation of the first DC-DC converter, the detection voltage of the capacitor voltage detection means in the state where the input-output current of the capacitor is adjusted to the third predetermined current value by controlling the operation of the first DC-DC converter, and the third predetermined current value.

In addition, the internal resistance value of the capacitor increases along with the progress of deterioration of the capacitor, and therefore the deterioration level determination means is capable of accurately determining the deterioration level of the capacitor on the basis of a change in the internal resistance value of the capacitor calculated by the internal resistance calculation means, by suppressing the effect of individual variability of the capacitor.

DETAILED DESCRIPTION OF THE PREFERRED EMBODIMENTS

Figure 1:
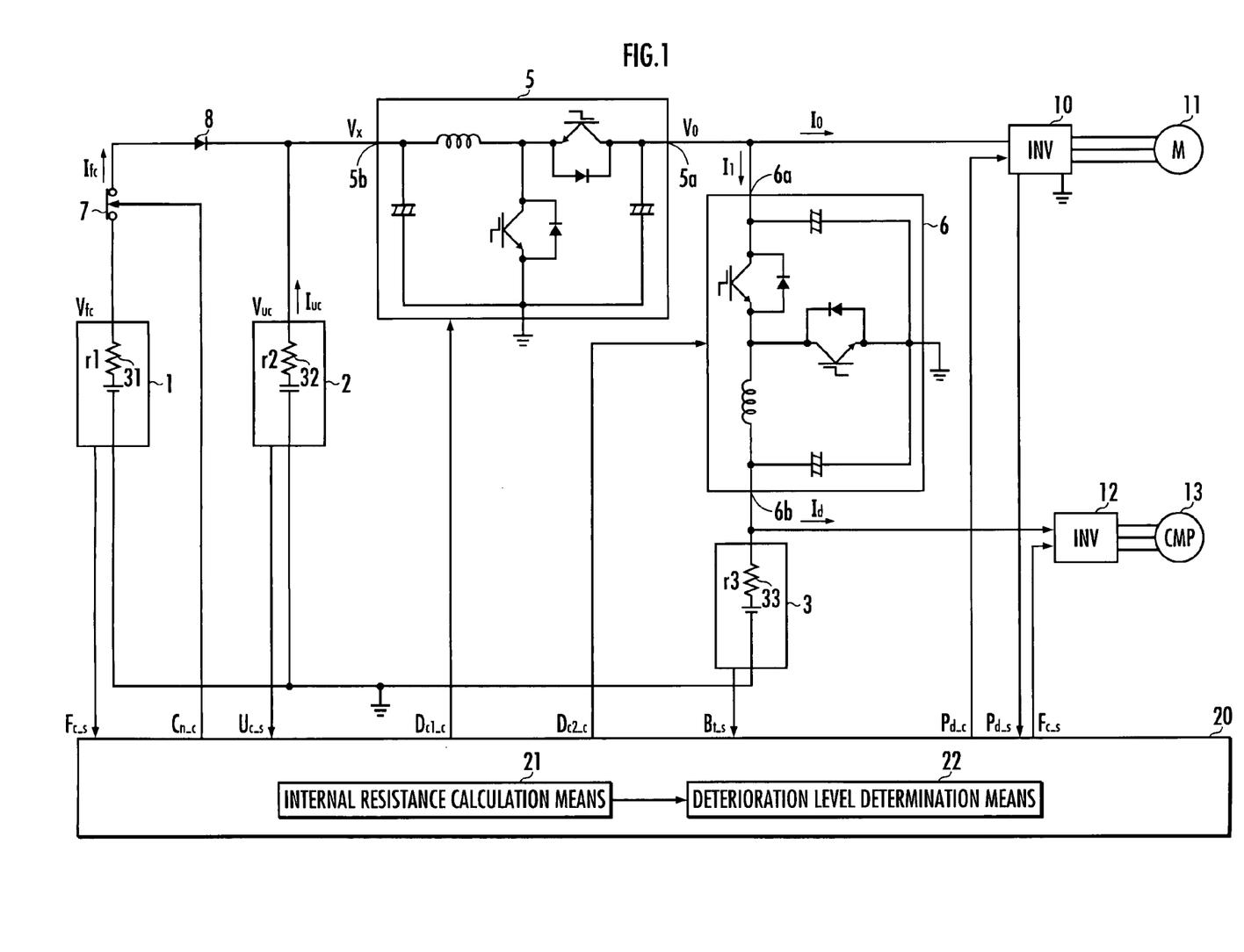
FIG. 1 is a configuration diagram of a fuel cell power supply.
Figure 2:
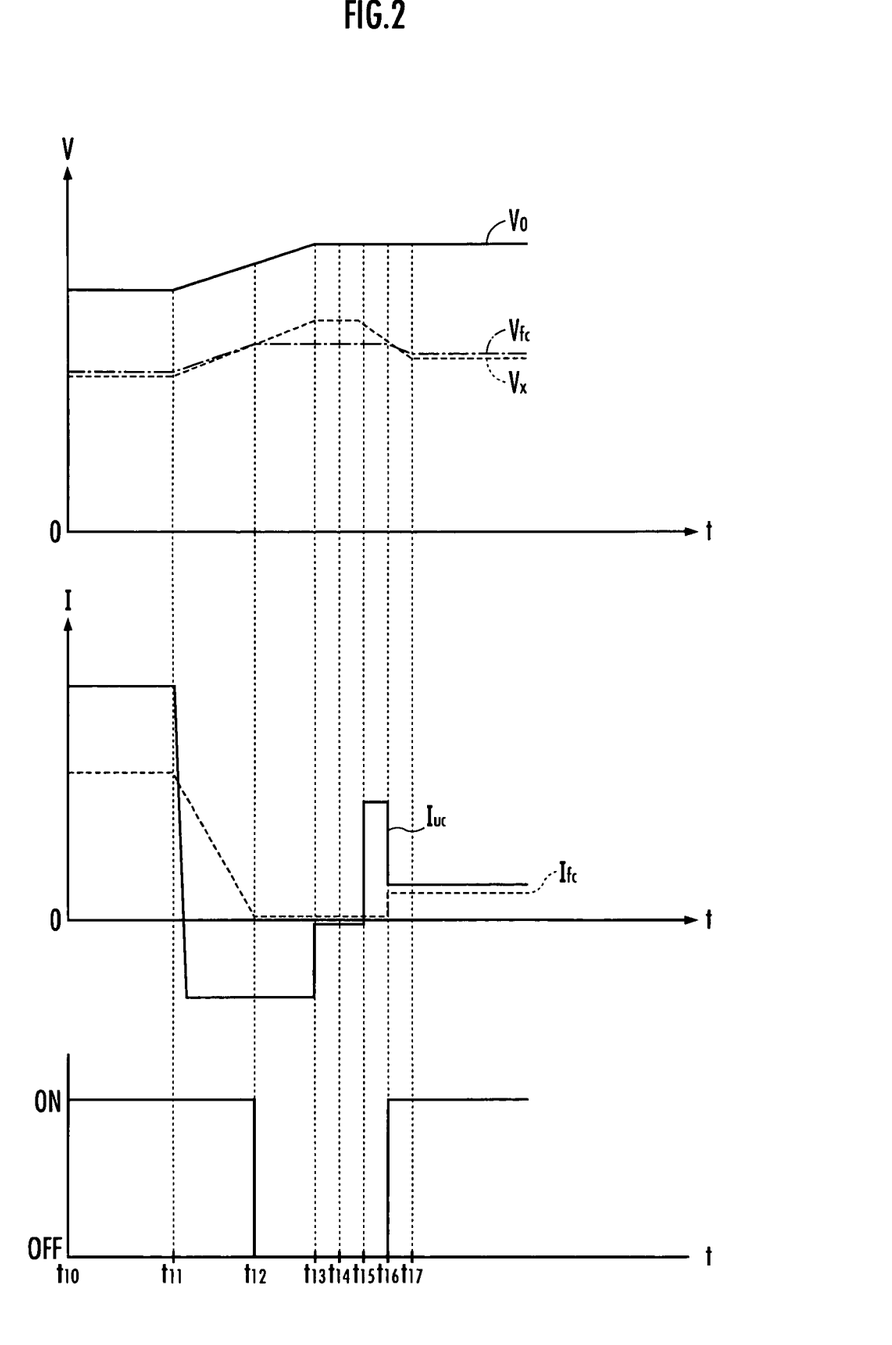
FIG. 2 is a timing chart for calculating an internal resistance value of a fuel cell shown in FIG. 1.
Figure 3:
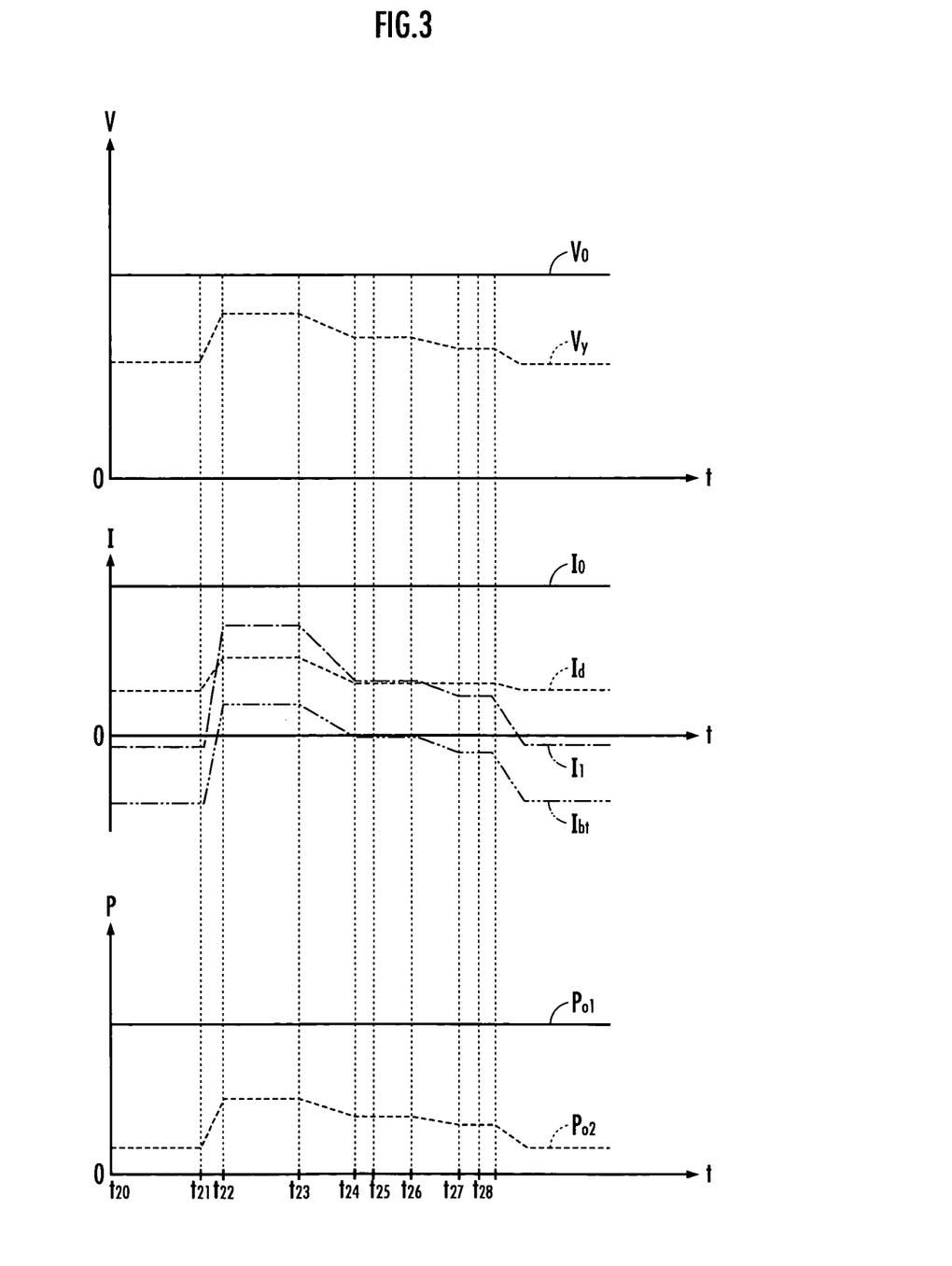
FIG. 3 is a timing chart for calculating an internal resistance value of a lithium ion battery shown in FIG. 1.
Figure 4:
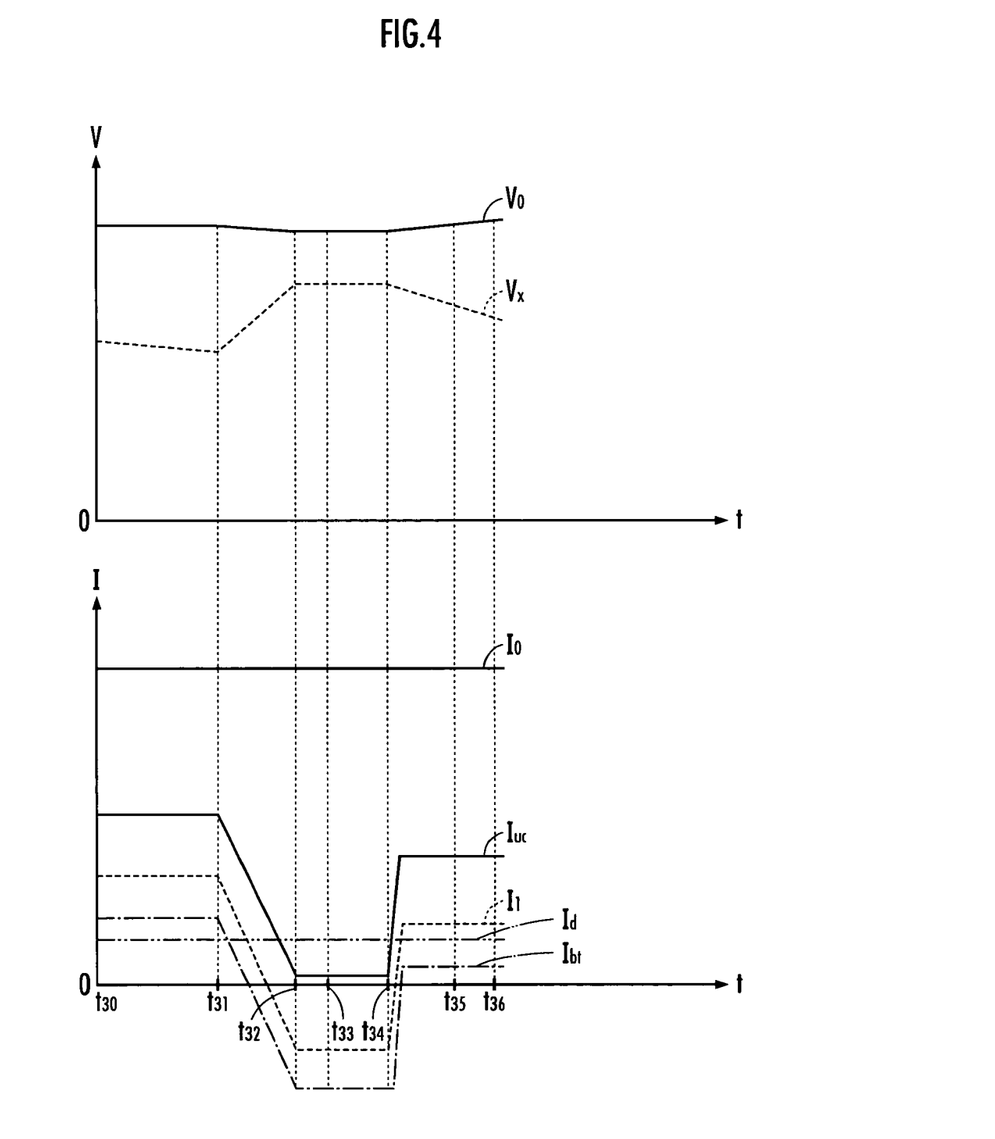
FIG. 4 is a timing chart for calculating an internal resistance value of a capacitor shown in FIG. 1.

The preferred embodiments of the present invention will now be described in detail hereinafter with reference to FIG. 1 to FIG. 4. FIG. 1 shows a configuration diagram of a fuel cell power supply in this embodiment. FIG. 2 shows a timing chart for calculating an internal resistance value of a fuel cell shown in FIG. 1. FIG. 3 shows a timing chart for calculating an internal resistance value of a lithium ion battery shown in FIG. 1. FIG. 4 shows a timing chart for calculating an internal resistance value of a capacitor shown in FIG. 1.

Referring to FIG. 1, the fuel cell power supply according to this embodiment is mounted on a fuel cell vehicle. The fuel cell power supply includes a fuel cell 1, an electric double layer capacitor 2 (which corresponds to a capacitor according to the present invention and is hereinafter simply referred to as "capacitor 2") connected to the fuel cell 1 in parallel, a lithium-ion battery 3 (which corresponds to a power storage means of the present invention and is hereinafter simply referred to as "battery 3"), a first DC-DC converter 5 in which a first I/O section 5a is connected to a motor 11 (which corresponds to an electric load and motor of the present invention) via a first inverter 10 and a second I/O section 5b is connected to the fuel cell 1 via a diode 8, a second DC-DC converter 6 in which a first I/O section 6a is connected to the first inverter 10 and a second I/O section 6b is connected to the battery 3 and a second inverter 12, a contactor 7 (which corresponds to a switching means of the present invention) which switches a connection between the fuel cell 1 and the first DC-DC converter 5 between a conducting state and a non-conducting state, and a compressor 13 which is connected to a second inverter 12 to supply the fuel cell 1 with a reaction gas (oxygen).

Moreover, the fuel cell power supply includes a controller 20 which is an electronic unit composed of a microcomputer (not shown) or the like and controls the general operation of the fuel cell power supply. Thereby, the microcomputer executes a control program of the fuel cell power supply, whereby the controller 20 functions as an internal resistance calculation means 21 which calculates the internal resistance values of the fuel cell 1, the capacitor 2, and the battery 3 and as a deterioration level determination means 22 which determines the deterioration levels of the fuel cell 1, the capacitor 2, and the battery 3 according to changes in the internal resistance values.

The controller 20 accepts inputs of detection signals (a temperature of the fuel cell 1, a terminal-to-terminal voltage, output current, reaction gas supply pressure, and other detection signals) Fc_s obtained by various sensors provided in the fuel cell 1, detection signals (a temperature of the capacitor 2, a terminal-to-terminal voltage, input-output current, and other detection signals) Uc_s obtained by various sensors provided in the capacitor 2, detection signals (a temperature of the battery 3, a terminal-to-terminal voltage, input-output current, and other detection signals) Bt_s obtained by various sensors provided in the battery 3, and detection signals (current and voltage supplied to the motor 11, regenerative current and voltage of the motor 11, and other detection signals) Pd_s obtained by various sensors provided in the inverter 10.

The sensor which is provided in the fuel cell 1 to detect a terminal-to-terminal voltage Vfc of the fuel cell 1 corresponds to a fuel cell voltage detection means of the present invention. Moreover, the sensor which is provided in the capacitor 2 to detect the terminal-to-terminal voltage Vuc of the capacitor 2 corresponds to a capacitor voltage detection means of the present invention. Further, the sensor which is provided in the battery 3 to detect the terminal-to-terminal voltage of the battery 3 corresponds to a power storage means voltage detection means of the present invention.

Moreover, a control signal Fc_c output from the controller 20 controls the supply amount of the reaction gas from the compressor 13, thereby controlling the amount of power generation of the fuel cell 1. Further, a control signal Dc1_c controls the amount of electricity supplied to the first DC-DC converter 5 and the output voltage thereof and a control signal Dc2_c controls the amount of electricity supplied to the second DC-DC converter 6 and the output voltage thereof. Still further, a control signal Pd_c controls the amount of electricity supplied between the inverter 10 and the motor 11, thereby controlling a motoring torque and a regenerative torque of the motor 11.

The following describes calculation processing of a resistance value r1 of an internal resistance 31 (hereinafter, referred to as "internal resistance value r1") of the fuel cell 1 performed by the internal resistance calculation means 21 with reference to the timing chart shown in FIG. 2.

The upper section of FIG. 2 shows the transition of a voltage Vo of the first I/O section 5a of the first DC-DC converter 5, a terminal-to-terminal voltage Vfc of the fuel cell 1, and a voltage Vx of the second I/O section 5b of the first DC-DC converter 5, with the ordinate axis representing the voltage (V) and the abscissa axis representing the time (t).

The middle section of FIG. 2 shows the transition of input-output current Iuc of the capacitor 2 and output current Ifc of the fuel cell 1, with the ordinate axis representing the current (I) and the abscissa axis representing the time (t). Moreover, the lower section of FIG. 2 shows the transition of a switching condition of the contactor 7, with the ordinate axis representing the ON (conducting)/OFF (non-conducting) setting of the contactor 7 and the abscissa axis representing the time (t).

The internal resistance calculation means 21 calculates an internal resistance value r1 of the fuel cell 1 by performing the processes of steps 11 to 15 described below.

[Step 11]

Time $t_{10}$ to $t_{11}$ in FIG. 2 corresponds to the state where the motor 11 is in power running and then switched to regeneration mode at time $t_{11}$, thereby increasing the voltage Vo of the first I/O section 5a of the first DC-DC converter 5. The internal resistance calculation means 21 then charges the capacitor 2 with regenerative current supplied via the first inverter 10 and the first DC-DC converter 5 from the motor 11 and the output current Ifc of the fuel cell 1 by a switching operation of the first DC-DC converter 5. This gradually increases the voltage Vx (=the terminal-to-terminal voltage Vuc of the capacitor 2) of the second I/O section 5b of the first DC-DC converter 5 at time $t_{11}$ to $t_{12}$.

[Step 12]

The terminal-to-terminal voltage Vfc of the fuel cell 1 increases up to the voltage Vx of the second I/O section 5b of the first DC-DC converter 5 at time $t_{12}$ and the output current Ifc of the fuel cell 1 goes to zero (the current output of the fuel cell 1 stops). In this instance, the internal resistance calculation means 21 turns off (disconnects) the contactor 7, by which the fuel cell 1 maintains the state where the reaction gas (hydrogen and oxygen) is supplied and the current output stops.

Alternatively, it is possible to stop the current output of the fuel cell 1 only by controlling the first DC-DC converter 5 or to stop the current output of the fuel cell 1 only by turning off (disconnecting) the contactor 7.

[Step 13]

The internal resistance calculation means 21 detects the terminal-to-terminal voltage Vfc of the fuel cell 1 as an open-circuit voltage Vfco of the fuel cell 1 at time $t_{14}$ when the current output of the fuel cell 1 stops.

[Step 14]

The internal resistance calculation means 21 starts the voltage step-up operation of the first DC-DC converter 5 at time $t_{15}$ to discharge the capacitor 2 (Iuc>0). This gradually decreases the voltage Vx (=the terminal-to-terminal voltage Vuc of the capacitor 2) of the second I/O section 5b of the first DC-DC converter 5 from time $t_{15}$ and the voltage Vx reaches the terminal-to-terminal voltage Vfc of the fuel cell 1 at time $t_{16}$, thereby decreasing the discharge current Iuc of the capacitor 2.

[Step 15]

Subsequently, the internal resistance calculation means 21 controls the voltage step-up operation of the first DC-DC converter 5 so that the output current Ifc of the fuel cell 1 reaches a level Ifc_c (for example, is set to a value on the order of 0.1×Ifc_max [the maximum rated current value of the fuel cell 1]). The regenerative electric power of the motor 11 at time $t_{11}$ to $t_{17}$ is collected in the battery 3 via the second DC-DC converter 6.

[Step 16]

Subsequently, the internal resistance calculation means 21 detects the terminal-to-terminal voltage Vfc of the fuel cell 1 in a state where the output current Ifc of the fuel cell 1 is controlled to the level Ifc_c (hereinafter, the terminal-to-terminal voltage is referred to as Vfc_c) at time $t_{17}$. In this instance, the following equation (1) is satisfied with respect to the internal resistance value r1 of the fuel cell 1:

Eq. 1
$$Vfco - Ifc\_c \times r1 = Vfc\_c \quad (1)$$

where Vfco is an open-circuit voltage of the fuel cell 1, Ifc_c is a control current value of the fuel cell 1, r1 is an internal resistance value of the fuel cell 1, and Vfc_c is a terminal-to-terminal voltage of the fuel cell 1 when the output current is Ifc_c.

Therefore, the internal resistance calculation means 21 calculates the internal resistance value r1 of the fuel cell 1 by substituting the open-circuit voltage Vfco of the fuel cell 1 detected in step 13, the control current value Ifc_c in step 15, and the terminal-to-terminal voltage Vfc_c detected in step 16 in the above equation (1).

As described above, the internal resistance calculation means 21 calculates the internal resistance value r1 of the fuel cell 1 in the above processes of steps 11 to 16. The internal resistance value r1 of the fuel cell 1 increases along with the progress of deterioration of the fuel cell 1. Therefore, the deterioration level determination means 22 determines the deterioration level of the fuel cell 1 on the basis of a change in the internal resistance value r1 of the fuel cell 1 calculated by the internal resistance calculation means 21. If the internal resistance value r1 increases by, for example, 20% relative to the initial value (at the beginning to use the fuel cell 1), a notification means (LED, buzzer, or the like), which is not shown, gives notice of the deterioration.

The following describes the calculation processing of a resistance value r3 of the internal resistance 33 of the battery 3 (hereinafter, the resistance value is referred to as "internal resistance value r3") performed by the internal resistance calculation means 21 with reference to the timing chart shown in FIG. 3.

The upper section of FIG. 3 shows the transition of a voltage Vo of the first I/O section 5a of the first DC-DC converter 5 and a terminal-to-terminal voltage (=a voltage of the second I/O section 6b of the second DC-DC converter 6) Vy of the battery 3, with the ordinate axis representing the voltage (V) and the abscissa axis representing the time (t).

The middle section of FIG. 3 shows the transition of input current Io to the first inverter 10, input current Id to the second inverter 12, input-output current I1 to the first I/O section 6a of the second DC-DC converter 6, and input-output current Ibt of the battery 3, with the ordinate axis representing the current (I) and the abscissa axis representing the time (t).

The lower section of FIG. 3 shows the transition of output power Po1 of the first inverter 10 and output power Po2 of the second inverter 12, with the ordinate axis representing the power (P) and the abscissa axis representing the time (t).

The internal resistance calculation means 21 calculates an internal resistance value r3 of the battery 3 by performing the processes of steps 21 to 24 described below.

[Step 21]

Time $t_{21}$ in FIG. 3 represents a time point when the battery 3 switches from discharging to charging and the terminal-to-terminal voltage Vy of the battery 3 increases in the period from time $t_{21}$ to time $t_{22}$. Thereafter, the internal resistance calculation means 21 starts the control of the voltage of the second I/O section 6b of the second DC-DC converter 6 so that the input-output current Ibt of the battery 3 goes to zero by lowering or increasing the voltage of the second DC-DC converter 6 at time $t_{23}$. Thereby, the input-output current Ibt of the battery 3 gradually decreases and goes to almost zero at time $t_{24}$.

Even if the current Ibt becomes zero, the current I1 divided from output current (Io+I1) of the first DC-DC converter 5 is supplied to the second DC-DC converter 6 and the current Id is supplied to the second inverter 12 from the second DC-DC converter 6. Therefore, it is possible to continue the power generation of the fuel cell 1 by activating the compressor 13.

[Step 22]

Subsequently, the internal resistance calculation means 21 detects the terminal-to-terminal voltage Vy of the battery 3 as an open-circuit voltage Vyo of the battery 3 at time $t_{25}$ when the input-output current Ibt of the battery 3 is stably zero.

[Step 23]

Subsequently, the internal resistance calculation means 21 starts the control of the first DC-DC converter 5 and the second DC-DC converter 6 at time $t_{26}$ so that the input-output current Ibt of the battery 3 goes to a level Ibt_c (for example, is set to a value on the order of 0.1×Ibt_max [the maximum rated current value of the battery 3]). Thereby, the input-output current Ibt of the battery 3 goes to the level Ibt_c at time $t_{27}$.

[Step 24]

Subsequently, the internal resistance calculation means 21 detects the terminal-to-terminal voltage Vy of the battery 3 at time $t_{27}$ when the input-output current Ibt of the battery 3 is stable at the level Ibt_c (hereinafter, the terminal-to-terminal voltage is referred to as Vy_c). In this instance, the following equation (2) is satisfied with respect to the internal resistance value r3 of the battery 3:

Eq. 2
$$Vy\_c = Ibt\_c \times r3 + Vyo \quad (2)$$

where Vyo is an open-circuit voltage of the battery 3, Iy_c is a control current value of the battery 3, r3 is an internal resistance value of the battery 3, and Vy_c is a terminal-to-terminal voltage of the battery 3 when the output current is at the level Iy_c.

Therefore, the internal resistance calculation means 21 calculates the internal resistance value r3 of the battery 3 by substituting the open-circuit voltage Vyo of the battery 3 detected in step 22, the control current value Ibt_c in step 23, and the terminal-to-terminal voltage Vy_c detected in step 24 in the above equation (2).

In this manner, the internal resistance calculation means 21 calculates the internal resistance value r3 of the battery 3 in the above processes of steps 21 to 24. The internal resistance value r3 of the battery 3 increases along with the progress of deterioration of the battery 3. Therefore, the deterioration level determination means 22 determines the deterioration level of the battery 3 on the basis of the change in the internal resistance value r3 of the battery 3 calculated by the internal resistance calculation means 21. If the internal resistance value r3 increases by, for example, 20% relative to the initial value (at the beginning to use the battery 3), a notification means (LED, buzzer, or the like), which is not shown, gives notice of the deterioration.

The following describes the calculation processing of a resistance value r2 of the internal resistance 32 of the capacitor 2 (hereinafter, the resistance value is referred to as "internal resistance value r2") performed by the internal resistance calculation means 21 with reference to the timing chart shown in FIG. 4.

The upper section of FIG. 4 shows the transition of a voltage Vo of the first I/O section 5a of the first DC-DC converter 5 and a terminal-to-terminal voltage Vx (=a voltage of the second I/O section 5b of the first DC-DC converter 5) of the capacitor 2, with the ordinate axis representing the voltage (V) and the abscissa axis representing the time (t).

The lower section of FIG. 4 shows the transition of input current Io to the first inverter 10, input-output current Iuc of the capacitor 2, input-output current I1 of the first I/O section 6a of the second DC-DC converter 6, input current Id to the second inverter 12, and input-output current Ibt of the battery 3, with the ordinate axis representing the current (I) and the abscissa axis representing the time (t).

The internal resistance calculation means 21 calculates an internal resistance value r2 of the capacitor 2 by performing the processes of steps 31 to 35 described below.

[Step 31]

The internal resistance calculation means 21 starts the control of lowering the voltage Vo of the first I/O section 5a by decreasing the switching duty of the first DC-DC converter 5 so that the input-output current Iuc of the capacitor 2 goes to zero at time $t_{31}$ in FIG. 4. Thereby, the input-output current Iuc of the capacitor 2 gradually decreases and Iuc becomes substantially zero at time $t_{32}$.

[Step 32]

Subsequently, the internal resistance calculation means 21 detects the terminal-to-terminal voltage Vx of the capacitor 2 as an open-circuit voltage Vxo of the capacitor 2 at time $t_{33}$ when the input-output current Iuc of the capacitor 2 is stably zero.

[Step 33]

Subsequently, the internal resistance calculation means 21 starts the control of the first DC-DC converter 5 at time $t_{34}$ so that the input-output current Iuc of the capacitor 2 goes to a level Iuc_c (for example, is set to a value on the order of 0.1×Iuc_max [the maximum rated current value of the capacitor 2]). Thereby, the input-output current Iuc of the capacitor 2 increases to the level Iuc_c.

[Step 34]

Subsequently, the internal resistance calculation means 21 detects the terminal-to-terminal voltage Vx of the capacitor 2 at time $t_{35}$ when the input-output current Iuc of the capacitor 2 is stable at the level Iuc_c (hereinafter, the terminal-to-terminal voltage is referred to as Vx_c). In this instance, the following equation (3) is satisfied with respect to the internal resistance value r2 of the capacitor 2:

Eq. 3

$$Vx\_c = Vxo - Iuc\_c \times r2 \qquad (3)$$

where Vxo is an open-circuit voltage of the capacitor 2, Ix_c is a control current value of the capacitor 2, r2 is an internal resistance value of the capacitor 2, and Vx_c is a terminal-to-terminal voltage of the capacitor 2 when the output current is at the level Ix_c.

Therefore, the internal resistance calculation means 21 calculates the internal resistance value r2 of the capacitor 2 by substituting the open-circuit voltage Vxo of the capacitor 2 detected in step 32, the control current value Iuc_c in step 33, and the terminal-to-terminal voltage Vx_c detected in step 34 in the above equation (3).

As described above, the internal resistance calculation means 21 calculates the internal resistance value r2 of the capacitor 2 in the above processes of steps 31 to 34. The internal resistance value r2 of the capacitor 2 increases along with the progress of deterioration of the capacitor 2. Therefore, the deterioration level determination means 22 determines the deterioration level of the capacitor 2 on the basis of a change in the internal resistance value r2 of the capacitor 2 calculated by the internal resistance calculation means 21. If the internal resistance value r2 increases by, for example, 20% relative to the initial value (at the beginning to use the capacitor 2), a notification means (LED, buzzer, or the like), which is not shown, gives notice of the deterioration.

Although the internal resistance calculation means 21 calculates the internal resistance values of the fuel cell 1, the capacitor 2, and the battery 3 and the deterioration level determination means 22 determines the deterioration states of the fuel cell 1, the capacitor 2, and the battery 3 in this embodiment, it is possible to achieve the effect of the present invention by calculating the internal resistance values of at least one of the fuel cell 1 and the battery 3 and determining the deterioration thereof.

Further, although the motor 11 is illustrated as an electric load of the present invention and the open-circuit voltage of the fuel cell 1 is detected during regeneration of the motor 11 in this embodiment, the open-circuit voltage of the fuel cell 1 may be detected during power running of the motor 11. Moreover, the present invention is also applicable to a case where an electric load other than the motor is connected.

Still further, it is also possible to use one of the fuel cell 1, the battery 3, and the capacitor 2 having the lowest deterioration level (least deteriorated one) when the fuel cell 1, the battery 3, and the capacitor 2 are determined with respect to the deterioration level.

We claim:

1. A fuel cell power supply, comprising:
   a fuel cell;
   a first DC-DC converter having first and second I/O sections, with the first I/O section connected to an electric load and the second I/O section connected to the fuel cell;
   a power storage means; and a bidirectional second DC-DC converter having first and second I/O sections, with the first I/O section connected to the electric load and the second I/O section connected to the power storage means, wherein the fuel cell power supply further comprises:

a fuel cell voltage detection means which detects a terminal-to-terminal voltage of the fuel cell;

a controller programmed to cause a first state by controlling an operation of the first DC-DC converter to stop an output current of the fuel cell and supplying electric power from the power storage means to the electric load via the second DC-DC converter, and to cause a second state by controlling the operation of the first DC-DC converter to adjust the output current of the fuel cell to a first predetermined current value and supplying the electric power from the power storage means to the electric load via the second DC-DC converter;

an internal resistance calculator programmed to calculate an internal resistance value of the fuel cell on the basis of a detection voltage of the fuel cell voltage detection means in the first state, a detection voltage of the fuel cell voltage detection means in the second state, and the first predetermined current value; and a deterioration level determination element programmed to determine a deterioration level of the fuel cell on the basis of a change in the internal resistance value of the fuel cell calculated by the internal resistance calculator.

2. The fuel cell power supply according to claim 1, further comprising a power storage means voltage detection means which detects a terminal-to-terminal voltage of the power storage means, wherein:

the controller is programmed to cause a third state by controlling an operation of the second DC-DC converter to stop an input current and an output current of the power storage means and supplying electric power from the fuel cell to the electric load via the first DC-DC converter, and to cause a fourth state by controlling the operation of the second DC-DC converter to adjust the input current and the output current of the power storage means to a second predetermined current value and supplying the electric power from the fuel cell to the electric load via the first DC-DC converter;

the internal resistance calculator is programmed to calculate an internal resistance value of the power storage means on the basis of a detection voltage of the power storage means voltage detection means in the third state, a detection voltage of the power storage means voltage detection means in the fourth state, and the second predetermined current value; and the deterioration level determination element is programmed to determine a deterioration level of the power storage means on the basis of a change in the internal resistance value of the power storage means calculated by the internal resistance calculator.

3. The fuel cell power supply according to claim 1, further comprising:

a capacitor connected in parallel with the fuel cell; and a capacitor voltage detection means which detects a terminal-to-terminal voltage of the capacitor, wherein:

the controller is programmed to cause a third state by controlling the operation of the first DC-DC converter to stop an input current and an output current of the capacitor, and to cause a fourth state by controlling the operation of the first DC-DC converter to adjust the input current and the output current of the capacitor to a second predetermined current value;

the internal resistance calculator is programmed to calculate an internal resistance value of the capacitor on the basis of a detection voltage of the capacitor voltage detection means in the third state, a detection voltage of the capacitor voltage detection means in the fourth state, and the second predetermined current value; and the deterioration level determination element is programmed to determine a deterioration level of the capacitor on the basis of a change in the internal resistance value of the capacitor calculated by the internal resistance calculator.

4. A fuel cell power supply, comprising:

a fuel cell;

a first DC-DC converter having first and second I/O sections, with the first I/O section connected to an electric load and the second I/O section connected to the fuel cell;

a power storage means; and a bidirectional second DC-DC converter having first and second I/O sections, with the first I/O section connected to the electric load and the second I/O section connected to the power storage means, wherein the fuel cell power supply further comprises:

a switching means which switches a connection between the fuel cell and the first DC-DC converter between a conducting state and a non-conducting state;

a fuel cell voltage detection means which detects a terminal-to-terminal voltage of the fuel cell;

a controller programmed to cause a first state by controlling an operation of the switching means to disconnect power between the fuel cell and the first DC-DC converter and supplying electric power from the power storage means to the electric load via the second DC-DC converter, and to cause a second state by adjusting an output current of the fuel cell to a first predetermined current value and supplying the electric power from the power storage means to the electric load via the second DC-DC converter;

an internal resistance calculator programmed to calculate an internal resistance value of the fuel cell on the basis of a detection voltage of the fuel cell voltage detection means in the first state, a detection voltage of the fuel cell voltage detection means in the second state, and the first predetermined current value; and a deterioration level determination element programmed to determine a deterioration level of the fuel cell on the basis of a change in the internal resistance value of the fuel cell calculated by the internal resistance calculator.

5. The fuel cell power supply according to claim 4, further comprising a power storage means voltage detection means which detects a terminal-to-terminal voltage of the power storage means, wherein:

the controller is programmed to cause a third state by controlling an operation of the second DC-DC converter to stop an input current and an output current of the power storage means and supplying electric power from the fuel cell to the electric load via the first DC-DC converter, and to cause a fourth state by controlling the operation of the second DC-DC converter to adjust the input current and the output current of the power storage means to a second predetermined current value and supplying the electric power from the fuel cell to the electric load via the first DC-DC converter;

the internal resistance calculator is programmed to calculate an internal resistance value of the power storage means on the basis of a detection voltage of the power storage means voltage detection means in the third state, a detection voltage of the power storage means voltage detection means in the fourth state, and the second predetermined current value; and the deterioration level determination element is programmed to determine a deterioration level of the power storage means on the basis of a change in the internal resistance value of the power storage means calculated by the internal resistance calculator.

6. The fuel cell power supply according to claim 4, further comprising:

a capacitor connected in parallel with the fuel cell; and a capacitor voltage detection means which detects a terminal-to-terminal voltage of the capacitor, wherein:

the controller is programmed to cause a third state by controlling the operation of the first DC-DC converter to stop an input current and an output current of the capacitor, and to cause a fourth state by controlling the operation of the first DC-DC converter to adjust the input current and the output current of the capacitor to a second predetermined current value;

the internal resistance calculator is programmed to calculate an internal resistance value of the capacitor on the basis of a detection voltage of the capacitor voltage detection means in the third state, a detection voltage of the capacitor voltage detection means in the fourth state, and the second predetermined current value; and the deterioration level determination element is programmed to determine a deterioration level of the capacitor on the basis of a change in the internal resistance value of the capacitor calculated by the internal resistance calculator.

7. A fuel cell power supply, comprising:

a fuel cell;

a first DC-DC converter having first and second I/O sections, with the first I/O section connected to an electric load and the second I/O section connected to the fuel cell;

a power storage means; and a bidirectional second DC-DC converter having first and second I/O sections, with the first I/O section connected to the electric load and the second I/O section connected to the power storage means, wherein the fuel cell power supply further comprises:

a power storage means voltage detection means which detects a terminal-to-terminal voltage of the power storage means;

a controller programmed to cause a first state by controlling an operation of the second DC-DC converter to stop an input current and an output current of the power storage means and supplying electric power from the fuel cell to the electric load via the first DC-DC converter, and to cause the second state by adjusting the input current and the output current of the power storage means to a second predetermined current value and supplying the electric power from the fuel cell to the electric load via the first DC-DC converter;

an internal resistance calculator programmed to calculate an internal resistance value of the power storage means on the basis of a detection voltage of the power storage means voltage detection means in the first state, a detection voltage of the power storage means voltage detection means in the second state, and the second predetermined current value; and a deterioration level determination element programmed to determine a deterioration level of the power storage means on the basis of a change in the internal resistance value of the power storage means calculated by the internal resistance calculator.

8. The fuel cell power supply according to claim 7, further comprising:

a capacitor connected in parallel with the fuel cell; and a capacitor voltage detection means which detects a terminal-to-terminal voltage of the capacitor, wherein:

the controller is programmed to cause a third state by controlling an operation of the first DC-DC converter to stop an input current and an output current of the capacitor, and to cause a fourth state by controlling the operation of the first DC-DC converter to adjust the input-output current of the capacitor to a third predetermined current value;

the internal resistance calculator is programmed to calculate an internal resistance value of the capacitor on the basis of a detection voltage of the capacitor voltage detection means in the third state, a detection voltage of the capacitor voltage detection means in the fourth state, and the third predetermined current value; and the deterioration level determination element is programmed to determine a deterioration level of the capacitor on a basis of a change in the internal resistance value of the capacitor calculated by the internal resistance calculator.

9. A fuel cell power supply, comprising:

a fuel cell;

a first DC-DC converter having first and second I/O sections, with the first I/O section connected to a motor via an inverter and the second I/O section connected to the fuel cell;

a power storage means; and a bidirectional second DC-DC converter having first and second I/O sections, with the first I/O section connected to the motor via the inverter and the second I/O section connected to the power storage means, wherein the fuel cell power supply further comprises:

a fuel cell voltage detection means which detects a terminal-to-terminal voltage of the fuel cell;

a controller programmed to cause a first state by controlling an operation of the first DC-DC converter to stop an output current of the fuel cell and collecting regenerative electric power of the motor into the power storage means via the inverter and the second DC-DC converter by regeneration of the motor, and to cause a second state by controlling the operation of the first DC-DC converter to adjust the output current of the fuel cell to a first predetermined current value and collecting the regenerative electric power of the motor into the power storage means via the inverter and the second DC-DC converter by the regeneration of the motor;

an internal resistance calculator programmed to calculate an internal resistance value of the fuel cell on the basis of a detection voltage of the fuel cell voltage detection means in the first state, a detection voltage of the fuel cell voltage detection means in the second state, and the first predetermined current value; and a deterioration level determination element programmed to determine a deterioration level of the fuel cell on the basis of a change in the internal resistance value of the fuel cell calculated by the internal resistance calculator.

10. The fuel cell power supply according to claim 9, further comprising:

a capacitor connected in parallel with the fuel cell; and a capacitor voltage detection means which detects a terminal-to-terminal voltage of the capacitor, wherein:

the controller is programmed to cause a third state by controlling the operation of the first DC-DC converter to stop an input current and an output current of the capacitor, and to cause a fourth state by controlling the operation of the first DC-DC converter to adjust the input current and the output current of the capacitor to a second predetermined current value;

the internal resistance calculator is programmed to calculate an internal resistance value of the capacitor on the basis of a detection voltage of the capacitor voltage detection means in the third state, a detection voltage of the capacitor voltage detection means in the fourth state, and the second predetermined current value; and the deterioration level determination element is programmed to determine a deterioration level of the capacitor on the basis of a change in the internal resistance value of the capacitor calculated by the internal resistance calculator.

* * * * *